United States Patent Office. 

WILLIAM HOPSON, OF SOUTH MALDEN, MASSACHUSETTS.

Letters Patent No. 86,672, dated February 9, 1869.

IMPROVED VARNISH.

The Schedule referred to in these Letters Patent and making part of the same.

*To all to whom these presents may come:*

Be it known that I, WILLIAM HOPSON, of South Malden, in the county of Middlesex, and State of Massachusetts, have invented a "new and useful Varnish or Composition," to be applied to grained and other surfaces, for giving to them what is termed a "dead-finish;" and I do hereby declare the following to be a full and exact description of the said composition, and the mode of compounding and using it.

In carrying out my invention, I combine with copal or any of the well-known varnishes, (or with the materials of which they are composed,) a quantity of beeswax dissolved in spirits of turpentine.

In making thirty gallons of my said composition or varnish, I put into a tank, or other suitable vessel, fifteen pounds of beeswax, and add thereto eight gallons of the spirits of turpentine, in order to dissolve the same and render it fluent. After it is thoroughly dissolved, I add to the mixture twenty gallons of copal or other ordinary varnish, and then stir the mixture for two or three minutes, in order to thoroughly incorporate the several ingredients, or reduce them to one homogeneous mass. The composition will then be ready for use.

My said composition or varnish possesses several advantages over any of the common varnishes known to me as used in the arts for covering or protecting a painted or grained surface.

In the first place, it is not so liable to crack when exposed to heat as are the common varnishes of commerce, the beeswax imparting to it a very high degree of flexibility and elasticity. In the second place, it is much more economical, as, owing to its fluency, it can be spread over about double the surface of a like quantity of the ordinary varnishes, while its cost per gallon is no greater than that of any good varnish. In the third place, it is devoid of that glossy, gummy, and tacky touch and appearance, incident to most if not all of the ordinary varnishes; and, fourth, it gives to a grained surface a more natural appearance of the wood it is intended to imitate; and, fifth, it maintains its normal condition longer than any other varnish within my knowledge.

In using my said composition or varnish, it is to be spread on a surface by means of a brush, like any other varnish.

I would remark that I do not limit my invention to the precise proportions of the ingredients as above set forth, as they may be somewhat varied without changing the character of my invention.

Having thus described my said invention,

What I claim is as follows:

I claim my said new composition or varnish, composed of the materials and in the proportions substantially as above set forth.

WILLIAM HOPSON.

Witnesses:
  B. F. BROWN,
  LUCIUS HITCHINGS.